(12) United States Patent
Shimizu

(10) Patent No.: US 8,068,957 B2
(45) Date of Patent: Nov. 29, 2011

(54) BACKING OPERATION ASSIST APPARATUS FOR VEHICLE

(75) Inventor: Hiroaki Shimizu, Handa (JP)

(73) Assignee: Denso Corporation, Kariya (JP)

( * ) Notice: Subject to any disclaimer, the term of this patent is extended or adjusted under 35 U.S.C. 154(b) by 966 days.

(21) Appl. No.: 12/069,051

(22) Filed: Feb. 7, 2008

(65) Prior Publication Data

US 2008/0195285 A1 Aug. 14, 2008

(30) Foreign Application Priority Data

Feb. 14, 2007 (JP) ................................ 2007-033453

(51) Int. Cl.
*B60R 22/00* (2006.01)
(52) U.S. Cl. ........................................................ 701/45
(58) Field of Classification Search .................... 701/45, 701/51, 65; 340/438, 441
See application file for complete search history.

(56) References Cited

U.S. PATENT DOCUMENTS

| 7,660,659 B2* | 2/2010 | Watanabe et al. ................ 701/96 |
| 7,693,720 B2* | 4/2010 | Kennewick et al. ........... 704/275 |
| 7,739,008 B2* | 6/2010 | Cieler et al. ..................... 701/36 |
| 2005/0075770 A1* | 4/2005 | Taylor et al. ..................... 701/36 |
| 2005/0192725 A1* | 9/2005 | Li ..................................... 701/36 |
| 2006/0185921 A1* | 8/2006 | Cieler et al. ................... 180/204 |
| 2006/0190147 A1* | 8/2006 | Lee et al. ......................... 701/26 |
| 2008/0077294 A1* | 3/2008 | Danz et al. ....................... 701/41 |
| 2010/0049413 A1* | 2/2010 | Makino et al. ................... 701/65 |
| 2010/0289634 A1* | 11/2010 | Ikeda et al. .................... 340/441 |

FOREIGN PATENT DOCUMENTS

| JP | 08-119036 | 5/1996 |
| JP | 10-264722 | 10/1998 |
| JP | 2000-127874 | 5/2000 |
| JP | 2002-109697 | 4/2002 |
| JP | 2003-212041 | 7/2003 |
| JP | 2005-112267 | 4/2005 |
| JP | 2005-115853 | 4/2005 |
| JP | 2005-184395 | 7/2005 |
| JP | 2007-022280 | 2/2007 |

OTHER PUBLICATIONS

Office action dated Dec. 9, 2008 in corresponding Japanese Application No. 2007-033453.
Office action dated Jul. 30, 2009 in corresponding Japanese Application No. 2007-033453.

* cited by examiner

*Primary Examiner* — Faye M. Fleming
(74) *Attorney, Agent, or Firm* — Harness, Dickey & Pierce, PLC

(57) ABSTRACT

A vehicular backing operation assist apparatus is coupled with a movement direction demand unit for demanding a forward or backward movement of the vehicle and a change detection unit for detecting a change of a state of the vehicle taking place in association with a start-up of the vehicle. A reverse departure, which is a backing operation for exiting a parking state, is determined to be performed if a transit period from when the change of the state is detected to when the backward movement is demanded, is within a predetermined period. A reverse parking, which is a backing operation for entering a parking state, is performed, if the transit period is greater than or equal to the predetermined period. An assist control unit then provides an assist item for a backing operation relative to either the reverse departure or the reverse parking, which is determined to be performed.

16 Claims, 4 Drawing Sheets

BACKING OPERATION ASSIST APPARATUS FOR VEHICLE

CROSS REFERENCE TO RELATED APPLICATION

The present application is based on and incorporates herein by reference Japanese Patent Application No. 2007-33453 filed on Feb. 14, 2007.

FIELD OF THE INVENTION

The present invention relates to a backing operation assist apparatus for a vehicle, the apparatus assisting a driver when the vehicle reverses or moves backward.

BACKGROUND OF THE INVENTION

Patent Document 1 discloses a backing operation assist apparatus for a vehicle. The apparatus assists a driver when the vehicle moves backward. In Patent Document 1, several cameras are mounted in a vehicle to capture images of an area surrounding the vehicle. An operation scene is able to be selected by a driver from among a normal driving scene, a side-by-side parking scene, a parallel parking scene, a vehicle forward monitoring scene, a vehicle rearward monitoring scene, a pull-over-to-a-kerb scene, a narrow load scene etc. In accordance with the operation scene selected, a display unit displays a corresponding composite image including peripheral images of a forward view, rearward view, and a top view. The composite image allows the driver to see and recognize the images in the composite image simultaneously.

According to the technique disclosed in Patent Document 1, a driver needs to perform a selection operation for selecting an operation scene from among various scenes. The selection operation naturally costs the driver his/her time or trouble.

Patent Document 1: Japanese Patent No. 3803021 (JP-2002-109697 A)

SUMMARY OF THE INVENTION

It is an object of the present invention to provide a backing operation assist apparatus for a vehicle to allow a driver to be assisted in backing operation without needing additional time or trouble in selecting a suitable operation scene.

According to a first example of the present invention, a backing operation assist apparatus for a vehicle is provided as follows. The apparatus is coupled with a movement direction demand unit for demanding a forward movement or a backward movement of the vehicle and a change detection unit for detecting a change of a state of the vehicle taking place in association with a start-up of the vehicle. The apparatus includes a determination unit and an assist control unit. The determination unit is configured to make (i) a determination that a reverse departure, which is a backing operation for exiting a parking state, is performed if a transit time period, which ranges from when the change of the state is detected by the change detection unit to when the backward movement is demanded by the movement direction demand unit, is within a predetermined period, and (ii) a determination that a reverse parking, which is a backing operation for entering a parking state, is performed, if the transit time period is greater than or equal to the predetermined period. The assist control unit is configured to select one assist item from among an assist item for a backing operation relative to the reverse departure and an assist item for a backing operation relative to the reverse parking, in accordance with the determination made by the determination unit, and to control the selected one assist item.

According to a second example of the present invention, a backing operation assist apparatus for a vehicle is provided as follows. The apparatus is coupled with a movement direction demand unit for demanding a forward movement or a backward movement of the vehicle. The apparatus includes a determination unit in addition to the same assist control unit as that of the first example. The determination unit is configured to make (i) a determination that a reverse departure, which is a backing operation for exiting a parking state, is performed when the movement direction demand unit demands switching of a gear transmission of the vehicle from a parking position to a backward movement position, and (ii) a determination that a reverse parking, which is a backing operation for exiting a parking state, is performed when the movement direction demand unit demands switching of the gear transmission from a forward movement position or a neutral position to a backward movement position.

According to a third example of the present invention, a backing operation assist apparatus for a vehicle is provided as follows. The apparatus includes a determination unit in addition to the same assist control unit as that of the first or second example. The determination unit is configured to make (i) a determination that a reverse departure, which is a backing operation for exiting a parking state, is performed if a first predetermined condition in association with the reverse departure is satisfied, and (ii) a determination that a reverse parking, which is a backing operation for entering a parking state, is performed, if a second predetermined condition in association with the reverse parking is satisfied.

According to a fourth example of the present invention, a method is provided for a backing operation assist operation for a vehicle. The method includes (i) determining that a reverse departure, which is a backing operation for exiting a parking state, is performed if a first predetermined condition in association with the reverse departure is satisfied; (ii) determining that a reverse parking, which is a backing operation for entering a parking state, is performed, if a second predetermined condition in association with the reverse parking is satisfied; (iii) selecting one assist item from among a first assist item for backing operation relative to the reverse departure and a second assist item for backing operation relative to the reverse parking in accordance with the reverse departure or the reverse parking which is determined to be performed; and (iv) providing the selected one assist item.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

In embodiments of the present invention, a backing operation assist apparatus is applied to a vehicular navigation system 1, which will be explained below with reference to the drawings.

First Embodiment

The navigation system 1 is mounted in a subject vehicle C. The navigation system 1 includes a driving assist function in addition to a usual navigation function. The driving assist function is to assist a driver of the vehicle C with a camera capturing an image of a peripheral area or scenery outside of the vehicle C.

Figure 1:
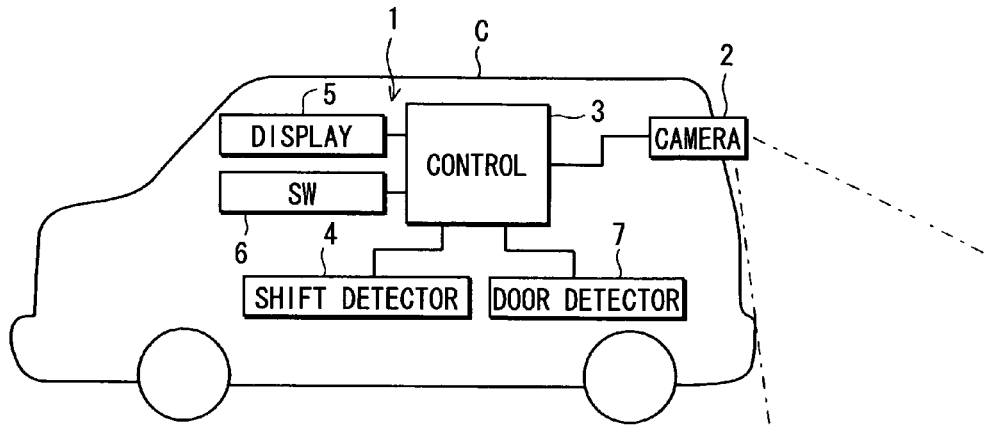
FIG. 1 schematically shows an electrical construction of a backing operation assist apparatus according to a first embodiment of the present invention.

As shown in FIG. 1, the navigation system 1 includes a camera 2, a shift position detection unit 4, a display unit 5, an operation switch group 6, a door open-close detection unit 7, and a control circuit 3 coupled with the foregoing. The control circuit 3 mainly includes a known ECU (Electronic Control Unit) to control overall operations of the navigation system 1.

As shown in FIG. 1, the camera 2 is disposed on a top-center rear portion of the vehicle C so as to be capable of taking or capturing an image rearward of (or behind) the vehicle C. In accordance with a control signal from the control circuit 3, the camera 2 captures an image of an area rearward of the vehicle and provides data on the captured image to the control circuit 3.

The shift position detection unit 4 detects a gear transmission range (i.e., a shift position) that is switched by a shift lever operation (not shown) performed by the driver. The shift lever may function as a movement direction demand means or unit used to demand forward or backward movement. In a vehicle having an automatic transmission system, the shift position detection unit 4 may be configured to detect a parking range (i.e., P: a parking position), a reverse range (R: a backward movement position), a neutral range (N: a neutral position), a driving range (D: a forward movement position), a second range (2: a forward movement position), and a first (or locked) range (1 or L: a forward movement position).

The display unit 5 includes, for example, a liquid crystal screen. The display unit 5 is capable of displaying an image of an area rearward of the vehicle and a map image associated with the navigation function used when vehicle navigation is activated. The operation switch group 6 may function as a switch means or unit and includes, for example, a touch panel window and a push-button switch (none shown). The touch panel window may be displayed on a top part of the screen of the display unit 5. The push-button switch may be disposed at a portion surrounding of the screen of the display unit 5. The operation switch group 6 may includes a remote controller (not shown) as needed.

The door open-close detection unit 7 is coupled with a switch to sense that a door of the vehicle C is opened or closed. The door open-close detection unit 7 thus detects a door open state and a door close state when the driver opens and closes the door, respectively. The door open-close detection unit 7 is configured to transmit to the control circuit 3 a signal indicative of a door state, either door open state or door close state. The above units 2 to 7 are electrically coupled through an in-vehicle LAN (Local Area Network) or a communication cable etc.

When the operation switch group 6 is operated, the control circuit 3 causes an image captured by the camera 2 to be displayed on the screen of the display unit 5. The control circuit 3 is able to control switching of displayed images.

Figure 2A:
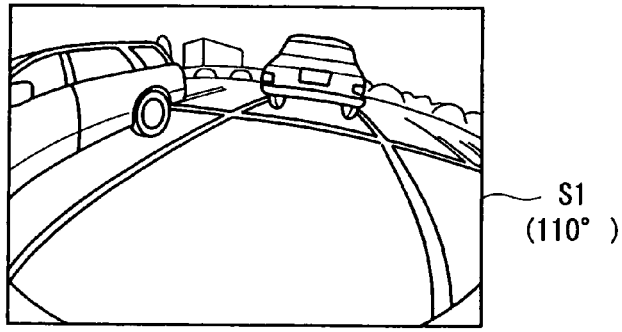
FIG. 2A shows an example of an assist image displayed when backing operation is performed to enter a rear end parking state.
Figure 2B:
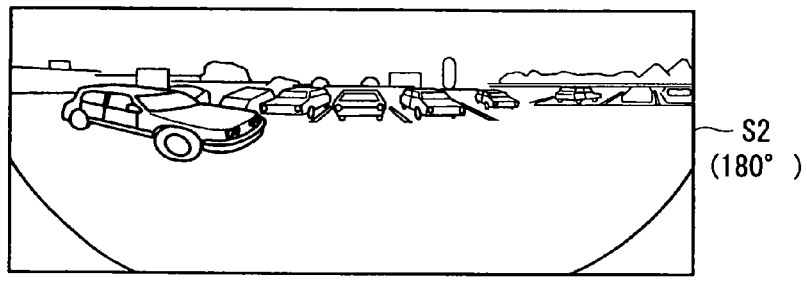
FIG. 2B shows an example of an assist image displayed when backing operation is performed to exit a front end parking state.
Figure 2C:
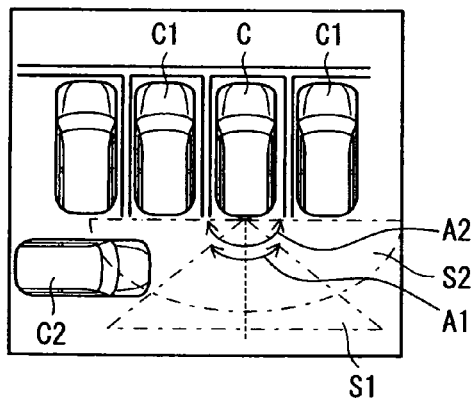
FIG. 2C schematically shows a field of view associated with the backing operation assist apparatus.
Figure 2D:
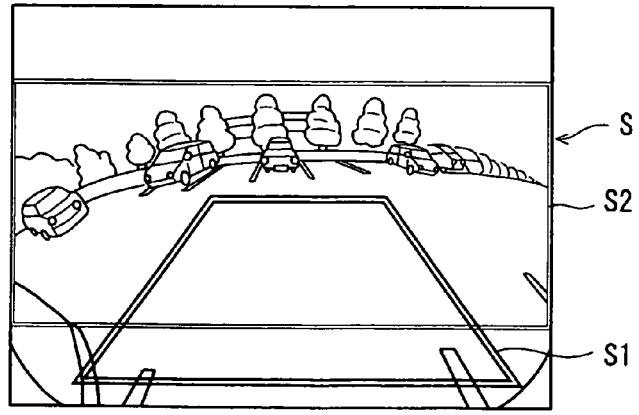
FIG. 2D is explanatory diagram associated with a method for obtaining an assist image.

FIGS. 2A,2B shows an examples of an assist images which is displayed on the screen of the display unit 5. FIG. 2A illustrates an assist image, and which may be an appropriate image for a reverse parking (e.g., or reversely entering a parking area), which; the reverse parking or reversely entering a parking area may be defined as a backing operation or backward movement for entering a state of parking, for instance, a state of rear end parking. FIG. 2B illustrates shows an example of an assist image which is an appropriate image for a reverse departure, which (e.g., or reversely exiting a parking area); the reverse departure or reversely exiting a parking area may be defined as a backing operation or backward movement for exiting or departing from a state of parking, for instance, a state of front end parking. FIG. 2C schematically shows a rearward field of view of a vehicle. FIG. 2D schematically illustrates a captured image of an area rearward of the vehicle C, and are used for explaining a method for obtaining an assist images.

As shown in FIG. 2D, the camera 2 provided in a rear portion of the vehicle C captures an image having a field of view S (field of view can be also referred to as covering area). The field of view S can be defined to have a covering angle of 180 degrees with respect to a rear side or portion of the vehicle C. When the assist image is processed and obtained, an image area corresponding to a first filed of rear view S1 is cut out, and the cutout image is enlarged in both the longitudinal direction and the transverse direction. When another assist image is processed and obtained, another image area corresponding to a second field of rear view S2 is cut out, and the cutout image is enlarged in both the longitudinal direction and the transverse direction. The first field of rear view S1 is narrow; the second field of rear view S2 is wide.

As a reverse parking is determined to start or perform, a backing operation assist process starts by using the screen of the display unit 5. In such a case, as shown in FIG. 2A, it is appropriate to display or indicate the first field of rear view S1 covering a narrow area. The first field of rear view S1 has a narrow covering angle (see S1, A1 in FIG. 2C), for example, of 110 degree. This is because the vehicle C moves only around a relatively limited area in back of the vehicle in the reverse parking and it would be enough for the driver to check a presence of an obstacle in the limited area.

Likewise, as a reverse departure is determined to start or perform, a backing operation assist process starts by using the screen of the display unit 5. In such a case, as shown in FIG. 2B, it is appropriate or rather necessary to display or indicate the second field of rear view S2 covering a wide area. The second field of rear view S2 has a wide covering angle (see S2, A2 in FIG. 2C), for example of 180 degrees. This is because it is difficult to confirm safety of a wide area rearward from the driver seat of the vehicle C. As seen in FIG. 2C, the above difficulty may occur, for example, in the following situation. The vehicle C is stopped in the front end parking state with further forward movement impossible; moreover, other vehicles C1 are located immediately adjacent to the vehicle C in both the sides. Yet further, as seen in FIG. 2C, another vehicle C2 is located in a blind spot of the driver of the vehicle C2 to thereby prevent the driver of the vehicle C from recognizing the presence of the vehicle C2. In such a case, an assist image having only a narrow field of view is not sufficient. Therefore, when the vehicle C is determined to start the reverse departure, the control circuit 3 causes the display unit 5 to display an assist image having a wide field of view, which allows recognition of another vehicle such as the vehicle C2 in FIG. 2C.

In the backing operation assist apparatus according to the present embodiment, when the shift lever is positioned in the backward movement position, it is automatically check whether the vehicle C is to perform a reverse parking or reverse departure. It is thus possible to appropriately assist the subject vehicle C or the driver of the vehicle C to perform backing operation.

A control process or backing operation assist process associated with the backing operation assist apparatus according to the present embodiment is described below with reference to FIG. 3.

The control circuit 3 obtains a door state of a vehicle including the door open state or the door close state, which is detected by the door open-close detection unit 7. The control circuit 3 includes a timer to begin timing at time when the door state is switched from the door open state to the door close state. The timer times a transit time period starting from when the door is determined to be closed. The control circuit 3 sets or designates a door open-close flag. The door open-close flag is used for switching an assist image displayed for a reverse parking and an assist image displayed for a reverse departure therebetween.

Figure 3:
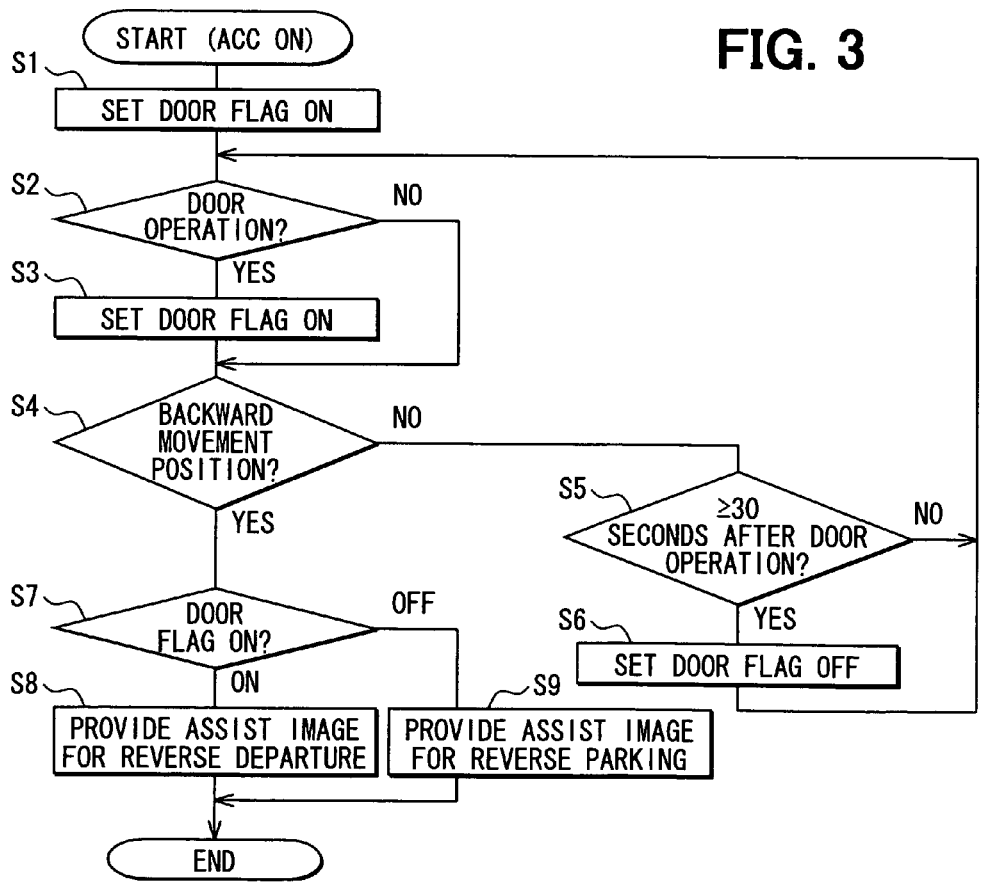
FIG. 3 is a flowchart schematically showing a control process associated with the backing operation assist apparatus according to the first embodiment.

The control circuit 3 sets the door open-close flag to an ON state at S1 in FIG. 3 when the vehicle C is started up or activates by turning on an ignition switch of the vehicle C. This is because the control circuit 3 anticipates a case where while the ignition switch is turned off, a door open-close operation could not have been detected. Here, the door open-close operation signifies an operation in which the door state is switched from the door open state to the door close state. With using the door open-close detection unit 7, the control circuit 3 checks at S2 whether the door open-close operation is performed. When the door open-close operation is determined to be performed, the door open-close flag is set to the ON state at S3.

The control circuit 3 determines at S4 whether the shift lever is positioned in the backward movement position or another position. When the control circuit 3 determines that the shift lever is positioned in a position other than the backward movement position, corresponding to "NO" at S4, the control circuit 3 performs Step S5. At Step S5, the control circuit 3 checks whether a transit time period from a time when the door open-close operation is performed to a present time is greater than or equal to a predetermined period with using the timer. The time when the door open-close operation is performed is referred to as a door operation time. The predetermined period is, for example, 30 seconds. When the transit time period between the door operation time and the present time is less than the predetermined period, corresponding to "NO" at S5, processing returns to Step S2. When the transit time period between the door operation time and the present time is greater than or equal to the predetermined period, corresponding to "YES" at S5, the control circuit 3 performs Step S6 at which the door open-close flag is set to an OFF state. After Step S6, processing returns to Step S2.

When the control circuit 3 determines that the shift lever is positioned in the backward movement position, corresponding to "YES" at S4, the control circuit 3 performs Step S7 at which the door open-close flag is referred to. When the door open-close flag is set to the OFF state, corresponding to "NO" at S7, the control circuit 3 performs Step S9. At Step S9, the control circuit 3 controls the display unit 5 so that the display unit 5 displays an assist image for the reverse parking on the screen.

In contrast, when the door open-close flag is set to the ON state, corresponding to "YES" at S7, the control circuit 3 performs Step S8. At Step S8, the control circuit 3 controls the display unit 5 so that the display unit 5 displays an assist image for the reverse departure on the screen.

In other words, the control circuit 3 causes the display unit 5 to display the assist image for the reverse parking on the screen (i.e., S9) when all the following conditions are satisfied in order: (i) the door of the vehicle C is changed from the open state to the close state (i.e., S2, S3); (ii) the shift lever is not positioned in the reverse movement position (i.e., NO at S4); (iii) the predetermined period (e.g., 30 seconds) passes (i.e., YES at S5) to thereby set the door open-close flag to the OFF state; and (iv) the shift lever is positioned in the backward movement position.

Thus, Steps S2, S3 at which the door of the vehicle C is changed from the open state to the close state may function as a change detection means or unit for detecting a change of a state of the vehicle C taking place in association with a start-up of the vehicle C. In other words, the control circuit 3 and the door open-close detection unit 7 may function as a change detection means or unit.

Further, steps preceding Step S9 or S8 executed by the control circuit 3 may function as a determination means or unit for determining that a reverse parking or reverse departure, respectively, is performed; Steps S9, S8 executed by the control circuit 3 may function as an assist control means or unit for controlling an assist item (i.e., assist image) corresponding to the reverse departure or the reverse parking which is determined to be performed.

In the backing operation assist apparatus according to the present embodiment, if backing operation takes place, the control circuit 3 causes the display unit 5 to appropriately display an assist image having the first field of view S1 being narrow or the second field of view S2 being wide.

That is, when the shift lever is positioned in the backward movement position before the transit time period from the door operation time to the present time exceeds the predetermined period, the control circuit 3 determines that the vehicle C is going to perform backing operation for a reverse departure. The control circuit 3 thereby causes the display unit 5 to display the assist image having the second field of view S2 being wide on the screen.

In contrast, when the shift lever is positioned in the reverse movement position after the transit time period exceeds the predetermined period, the control circuit 3 determines that the vehicle C is going to perform backing operation for a reverse parking. When the shift lever is positioned in the backward movement position before the transit time period is greater than or equal to the predetermined period, it is easily presumable that the vehicle C is going to perform a reverse departure. The control circuit 3 thereby causes the display unit 5 to display the assist image having the first field of view S1 being narrow on the screen. The assist image may illustrate a relatively narrow parking area. As a result, when the vehicle C starts a backing operation, the driver can automatically receive an appropriate driving assistance necessary for the driver with driver's time and trouble saved.

A conventional in-vehicle driving assist apparatus generally includes a display unit having a screen smaller than that of an ordinary display unit. As explained in Patent Document 1, if multiple captured images are simultaneously displayed on such one screen, a low level of visibility may be only provided. In the backing operation assist apparatus according to the present embodiment, the image captured by one camera is processed and displayed on the screen of the display unit 5. Therefore, a high level of visibility is provided with the screen of the display unit 5.

Second Embodiment

Figure 5A:
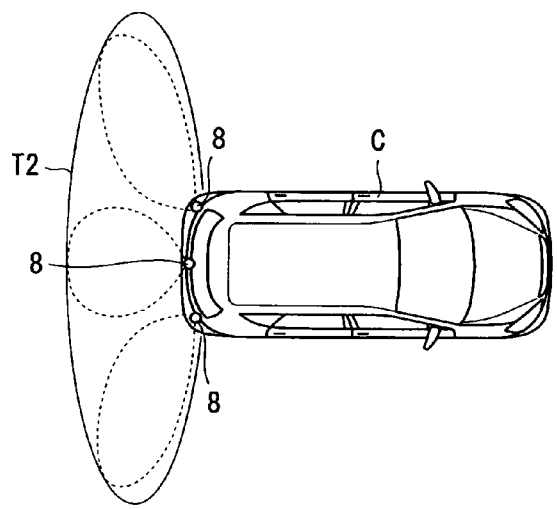
FIGS. 5A and 5B are explanatory diagrams associated with warning areas.
Figure 5B:
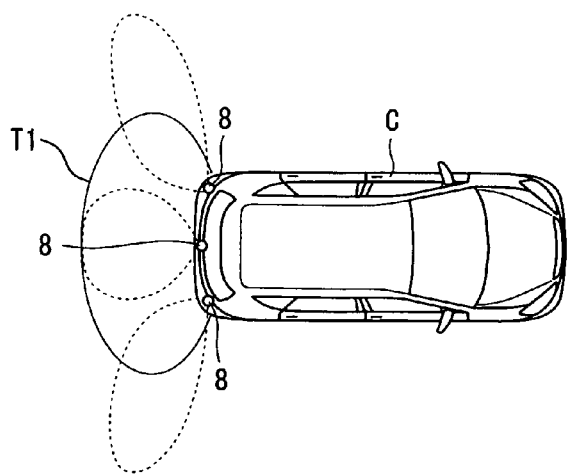
Figure 6:
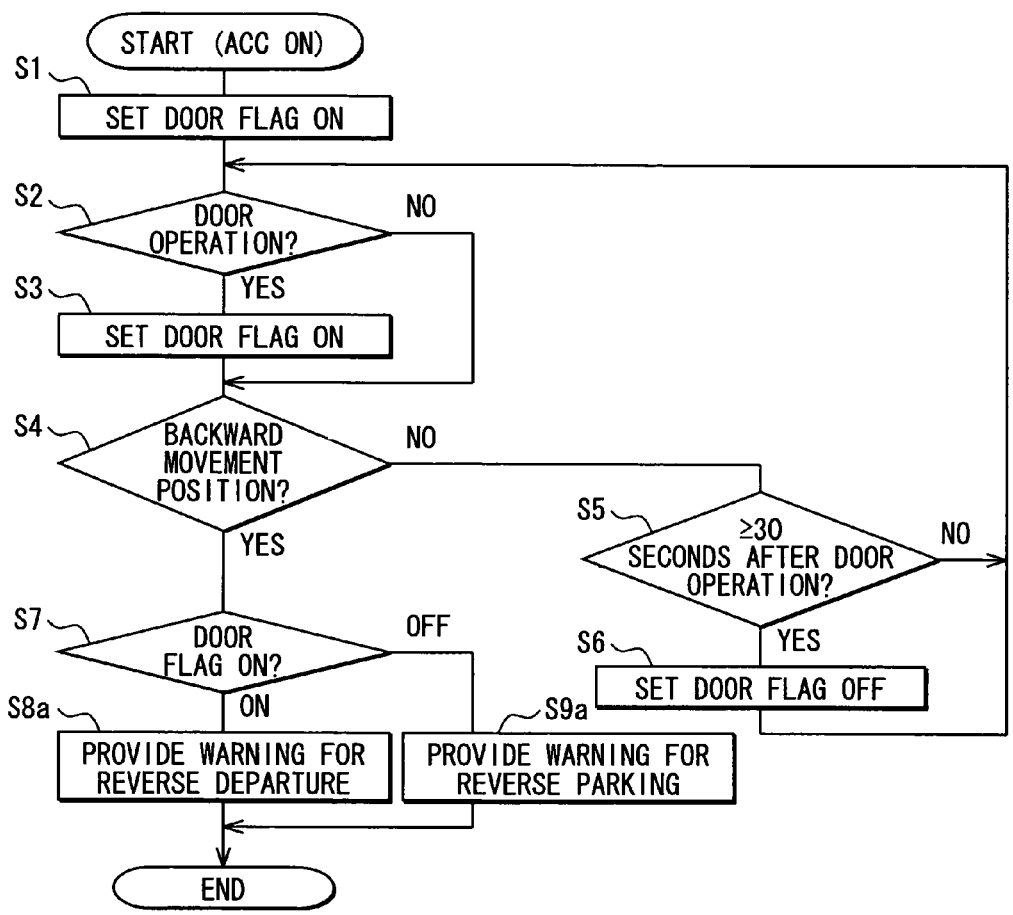
FIG. 6 is a flowchart schematically showing a control process associated with the backing operation assist apparatus according to the second embodiment.

A backing operation assist apparatus for a vehicle according to a second embodiment is described below with reference to FIGS. 4 to 6. In the second embodiment, the control circuit 3 controls a warning operation for notification (or warning) in a vehicle. Like reference numerals refer to like devices, steps, or the like between the first and second embodiments.

Figure 4:
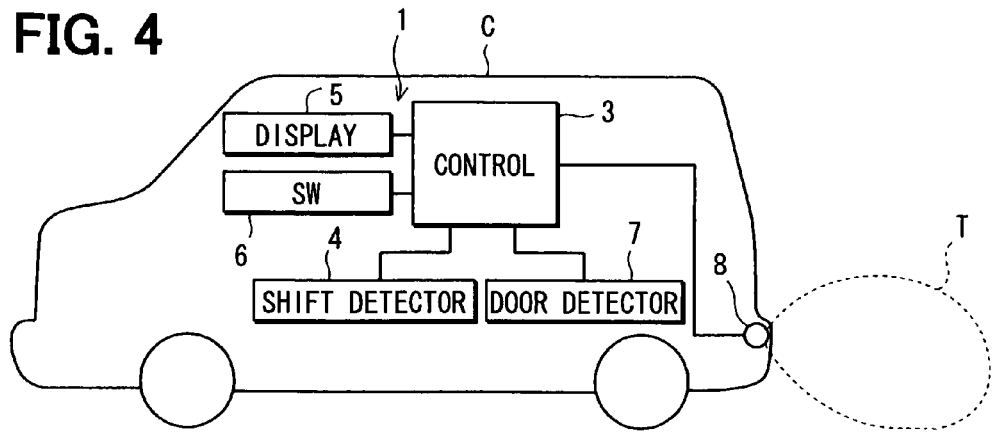
FIG. 4 is an electrical construction of a backing operation assist apparatus according to a second embodiment of the present invention.

FIG. 4 is a block diagram schematically showing an electrical construction of a backing operation assist apparatus for a vehicle. As shown in FIGS. 5A, 5B, a sonar 8 includes multiple detection devices 8 which are disposed on a right rear part (near the right corner) of the vehicle C, a left rear part (near the left corner) of the vehicle C, and a central rear part of the vehicle C. The sonar 8 is thus configured to detect an obstacle located in an area adjacent to the rear right side of the vehicle C, the rear left side of the vehicle C or the central rear side of the vehicle C if the above obstacle is located in a rearward predetermined warning area T as a covering area. As shown in FIG. 4, the sonar 8 is coupled with the control circuit 3; thereby, the control circuit 3 determines presence of an obstacle located in the rearward predetermined warning area T FIG. 6 is a flowchart schematically showing the warning process. As shown in FIG. 6, when the door open-close flag is set to the OFF state, the control circuit 3 performs Step S8a at which a warning control is performed in a second warning area T2. The second warning area T2 is used for facilitating backing operation for a reverse departure. When the door open-close flag is set to ON, the control circuit 3 performs Step S8b at which the warning control is performed in the first warning area T1. The first warning area T1 is used for facilitating backing operation for a reverse parking. Thus, steps preceding Step S9a or S8a executed by the control circuit 3 may function as a determination means or unit for determining that a reverse parking or reverse departure, respectively, is performed; Steps S9a, S8a executed by the control circuit 3 may function as an assist control unit for controlling an assist item (i.e., warning) corresponding to the reverse departure or the reverse parking which is determined to be performed.

As shown in FIG. 5B, the first warning range T1 for the reverse parking is relatively narrower than the second warning range T2 for the reverse departure. Although a range of detection of the sonar 8 is not infinite, a detection threshold of the sonar 8 is adjustable; thus, the first and second warning areas T1, T2 are able to be adjusted and controlled. When the second warning area T2 for the reverse departure has a rear 180-degree covering angle, an almost all required area can be covered. The driver can appropriately confirm an environmental or area adjacent to the rear side of the vehicle C.

Modification Embodiment

While the invention has been described with reference to preferred embodiments thereof, it is to be understood that the invention is not limited to the preferred embodiments and constructions. The invention is intended to cover various modifications and equivalent arrangements. For example, the invention is intended to cover following modifications.

In the above-described embodiments, a change of the door state is detected. Alternatively, a change of a driver's seat state in the vehicle C, a change of a seatbelt state in the vehicle C, or a change of an ignition switch state may be detected, the change of the ignition switch state occurring at time when an engine of the vehicle C is started (namely, at a start-up of the vehicle C). In such a case, determination may be made whether a period from a time when the above-described change is detected to a present time is greater than or equal to a predetermined period; then, the control circuit 3 controls an assist item to be provided in accordance with a detection result. In another alternative configuration, detection operation of the seat state, seatbelt state, or ignition switch state may be combined with the processes or steps according to the first and second embodiments, thus constituting a change detection means or unit by being combined with the control circuit 3.

Further, another alternative configuration may be achieved. When the shift lever is switched to the backward movement position from the parking position, a reverse departure may be determined. When the shift lever is switched to the backward movement position from the neutral position or forward movement position, a reverse parking may be determined. An assist item may be switched in accordance with the above determination. Thus, it may be easy to detect a change of a vehicle state at a time when the vehicle C is going to start the reverse parking or reverse departure. An advantage of the above alternative configuration is similar to that of the apparatuses according to the first and second embodiments.

In the above-description, the field of view of the assist image is configured to be automatically switched. Alternatively, the field of view or covering area may be configured to be manually switched, e.g., by using the operation switch group 6. In the above case, even if the assist image is not appropriately displayed, the driver can switch the assist image to another one. The driver can see and recognize an image the driver needs; therefore a convenient apparatus can be provided.

Each or any combination of processes, operations, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and provided in a computer via a communications network.

It will be obvious to those skilled in the art that various changes may be made in the above-described embodiments of the present invention. However, the scope of the present invention should be determined by the following claims.

What is claimed is:

1. A backing operation assist apparatus for a vehicle, the apparatus being coupled with a movement direction demand unit for demanding a forward movement or a backward movement of the vehicle and a change detection unit for detecting a change of a state of the vehicle taking place in association with a start-up of the vehicle, the apparatus comprising:
a determination unit configured to make
(i) a determination that a reverse departure, which is a backing operation for exiting a parking state, is performed if a transit time period, which ranges from when the change of the state is detected by the change detection unit to when the backward movement is demanded by the movement direction demand unit, is within a predetermined period, and (ii) a determination that a reverse parking, which is a backing operation for entering a parking state, is performed, if the transit time period is greater than or equal to the predetermined period; and an assist control unit configured to select one assist item from among an assist item for a backing operation relative to the reverse departure and an assist item for a backing operation relative to the reverse parking, in accordance with the determination made by the determination unit, and to control the selected one assist item.

2. The backing operation assist apparatus according to claim 1, wherein the change of the state of the vehicle taking place in association with the start-up of the vehicle occurs around a time when the vehicle is started up.

3. The backing operation assist apparatus according to claim 1, wherein the change of the state of the vehicle detected by the change detection unit includes a change of a door state of the vehicle from a door open state to a door close state.

4. The backing operation assist apparatus according to claim 1, wherein the change of the state of the vehicle detected by the change detection unit includes a change of a state of a seatbelt of the vehicle taking place when the seat belt is fastened.

5. The backing operation assist apparatus according to claim 1, wherein the change of the state of the vehicle detected by the change detection unit includes a change of a state of a driver's seat of the vehicle taking place when the seat is occupied.

6. The backing operation assist apparatus according to claim 1, wherein the change of the state of the vehicle detected by the change detection unit includes a change of a state of an ignition switch of the vehicle taking place when the ignition switch is turned on.

7. The backing operation assist apparatus according to claim 1, wherein:

the apparatus is further coupled with a display unit; and
the assist control unit is configured to cause the display unit to display
(i) an image having a first field of view rearward of the vehicle when the reverse departure is determined to be performed; and
(ii) an image having a second field of view rearward of the vehicle when the reverse parking is determined to be performed, the second field of view being narrower than the first field of view.

8. The backing operation assist apparatus according to claim 7, further comprising:

a switch unit configured to be manually switchable so that the first field of view and the second field of view are switched to each other.

9. The backing operation assist apparatus according to claim 7, wherein the first field of view has an angle of approximately 180 degrees.

10. The backing operation assist apparatus according to claim 1, wherein:

the apparatus is further coupled with an obstacle detection unit, which is disposed on a rear part of the vehicle and configured to detect an obstacle rearward of the vehicle; and the assist control unit is configured to provide an inside of the vehicle with a warning control with respect to
(i) an obstacle detected in a first warning area rearward of the vehicle when the reverse departure is determined to be performed, and
(ii) an obstacle detected in a second warning area rearward of the vehicle when the reverse parking is determined to be performed, the second warning area being narrower than the first warning area.

11. The backing operation assist apparatus according to claim 10, wherein the first warning area has a covering angle of approximately 180 degrees.

12. A backing operation assist apparatus for a vehicle, the apparatus comprising:

a determination unit configured to make
(i) a determination that a reverse departure, which is a backing operation for exiting a parking state, is performed if a first predetermined condition in association with the reverse departure is satisfied, and
(ii) a determination that a reverse parking, which is a backing operation for entering a parking state, is performed, if a second predetermined condition in association with the reverse parking is satisfied; and an assist control unit configured to select one assist item from among a first assist item for a backing operation relative to the reverse departure and a second assist item for a backing operation relative to the reverse parking, in accordance with the determination made by the determination unit, and to provide the selected one assist item; wherein the apparatus is further configured to be coupled with a movement direction demand unit for demanding a forward movement or a backward movement of the vehicle;

the first predetermined condition in association with the reverse departure is satisfied when a transit time period, which ranges from when a change of a state taking place in association with a start-up of the vehicle is detected to when the backward movement is demanded by the movement direction demand unit, is within a predetermined period; and the second predetermined condition in association with the reverse parking is satisfied when the transit time period is greater than or equal to the predetermined period.

13. The backing operation assist apparatus according to claim 12, wherein the first assist item for the backing operation relative to the reverse departure is provided by the assist control unit in association with a first covering area rearward of the vehicle;

the second assist item for the backing operation relative to the reverse parking is provided by the assist control unit in association with a second covering area rearward of the vehicle, the second covering area narrower than the first covering area.

14. The backing operation assist apparatus according to claim 13, wherein:

the apparatus is further coupled with a display unit; and
the assist control unit is configured to cause the display unit to display
(i) an image corresponding to the first covering area rearward of the vehicle when the reverse departure is determined to be performed, and
(ii) an image corresponding to the second covering area rearward of the vehicle when the reverse parking is determined to be performed.

15. The backing operation assist apparatus according to claim 13, wherein:
   the apparatus is further coupled with an obstacle detection unit, which is configured to detect an obstacle rearward of the vehicle; and
   the assist control unit is configured to provide an inside of the vehicle with a warning control with respect to
   (i) an obstacle detected by the obstacle detection unit in the first covering area rearward of the vehicle when the reverse departure is determined to be performed, and
   (ii) an obstacle detected by the obstacle detection unit in the second covering area rearward of the vehicle when the reverse parking is determined to be performed.

16. The backing operation assist apparatus according to claim 15, wherein
   the first covering area rearward of the vehicle has an angle of 180 degrees relative to a rear portion of the vehicle.

* * * * *